(12) United States Patent
Yamada (10) Patent No.: US 10,050,503 B2
(45) Date of Patent: Aug. 14, 2018

(54) MAGNETLESS ROTATING ELECTRIC MACHINE

(71) Applicant: Toyota Jidosha Kabushiki Kaisha, Toyota-shi Aichi-ken (JP)

(72) Inventor: Eiji Yamada, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 190 days.

(21) Appl. No.: 15/082,758

(22) Filed: Mar. 28, 2016

(65) Prior Publication Data

US 2016/0294239 A1 Oct. 6, 2016

(30) Foreign Application Priority Data

Mar. 31, 2015 (JP) .................................. 2015-073289

(51) Int. Cl.
| | |
|---|---|
| *H02K 19/00* | (2006.01) |
| *H02K 19/20* | (2006.01) |
| *H02K 1/00* | (2006.01) |
| *H02K 1/22* | (2006.01) |
| *H02K 16/04* | (2006.01) |
| *H02K 19/12* | (2006.01) |
| *H02K 19/28* | (2006.01) |

(52) U.S. Cl.
CPC ............. *H02K 16/04* (2013.01); *H02K 19/12* (2013.01); *H02K 19/28* (2013.01)

(58) Field of Classification Search
CPC ............... H02K 1/08; H02K 7/14; H02K 3/00
USPC ....... 310/140, 141, 166, 168, 171, 179, 184, 310/195, 198, 208, 261.1, 266
See application file for complete search history.

(56) References Cited

U.S. PATENT DOCUMENTS

| | | | | |
|---|---|---|---|---|
| 6,590,312 B1 * | 7/2003 | Seguchi | ................... | B60K 6/26 310/114 |
| 8,188,633 B2 * | 5/2012 | Quere | .................... | H02K 21/12 310/112 |

(Continued)

FOREIGN PATENT DOCUMENTS

| | | |
|---|---|---|
| JP | 2010-279165 A | 12/2010 |
| JP | 2011-244643 A | 12/2011 |
| WO | 2016051250 A2 | 4/2016 |

OTHER PUBLICATIONS

U.S. Appl. No. 15/514,256 (corresponds to WO2016/051250A2).

*Primary Examiner* — Jose Gonzalez Quinone
(74) *Attorney, Agent, or Firm* — Dinsmore & Shohl LLP (57) ABSTRACT

A magnetless rotating electric machine has an outer stator, an inner stator, and an annular rotor interposed between the outer stator and the inner stator. A plurality of outer-inner salient pole pairs are provided in the annular rotor along a circumferential direction of an annular rotor yoke. A rotor yoke coil is wound around one side of the rotor yoke and around another side of the rotor yoke along the circumferential direction with the respective outer-inner salient pole pairs sandwiched therebetween. Rectifying elements make a magnetic pole polarity of the outer salient poles and magnetic pole polarity of the inner salient poles, which are magnetized by an induced current of the rotor yoke coil caused by magnetization of the outer stator and the inner stator, identical with each other, and also make magnetic pole polarities of the adjacent outer-inner salient pole pairs opposite each other.

7 Claims, 7 Drawing Sheets

(56) References Cited

U.S. PATENT DOCUMENTS

| | | | |
|---|---|---|---|
| 8,754,568 B2* | 6/2014 | Kim | H02K 21/44 |
| | | | 310/114 |
| 2003/0102764 A1* | 6/2003 | Kusase | H02K 1/27 |
| | | | 310/266 |
| 2003/0201686 A1* | 10/2003 | Narita | H02K 16/04 |
| | | | 310/211 |
| 2005/0077800 A1* | 4/2005 | Hoeijmakers | B60K 6/26 |
| | | | 310/266 |
| 2011/0285238 A1 | 11/2011 | Kusase et al. | |
| 2015/0155753 A1* | 6/2015 | Kubo | H02K 3/487 |
| | | | 310/214 |
| 2015/0194855 A1* | 7/2015 | Kubo | H02K 3/527 |
| | | | 310/68 D |

* cited by examiner

MAGNETLESS ROTATING ELECTRIC MACHINE

CROSS-REFERENCE TO RELATED APPLICATIONS

This application claims priority to Japanese Patent Application No. 2015-073289, filed on Mar. 31, 2015, the entire disclosure of which is incorporated herein by reference.

TECHNICAL FIELD

The present disclosure relates to a magnetless rotating electric machine and, more particularly, to a double-stator magnetless rotating electric machine having an outer stator provided along an outer circumference of an annular rotor, and an inner rotor along an inner circumference of the annular rotor.

BACKGROUND

A known configuration for a magnetless rotating electric machine with a rotor that does not use a permanent magnet includes a rotor having rotor salient poles wound with a rotor coil, wherein an induced current develops in the rotor coil from a field magnet originating from a stator and magnetizes the rotor salient poles.

In addition to the related-art method for winding the coil around the rotor salient poles in the magnetless motor, another method for winding a coil around a rotor yoke is disclosed in JP 2010-279165 A. Also disclosed is a configuration in which salient poles of a rotor are provided with an induction coil to be placed close to a gap between the rotor and the stators and a common coil which differs from the induction coil and which is to be placed away from the stators. Further disclosed is a configuration including the induction coil wound around the rotor salient poles and the common coil wound around a rotor core.

JP 2011-244643 A discloses a double-stator motor as a method relevant to the present disclosure. Circumferentially-magnetized permanent magnets are placed on an annular rotor. An inner stator is placed on the inside of the rotor, and an outer stator is placed on the outside of the rotor. Each of the inner and outer stators has a Y-connected three-phase coil. The inner stator and the outer stator have the same number of magnetic poles. Permanent magnets placed on the rotor supply magnetic flux in parallel to both the inner stator and the outer stator.

The magnetless rotating electric machine has a cost advantage by virtue of not using an expensive magnet material. However, the coil wound around the rotor salient poles may break away from the rotor salient poles by the centrifugal force stemming from rotation of the rotor. When a coil presser, or the like, is used to prevent the breakaway of the coil, a structure becomes complicated, which imposes a limitation on a space for winding the coil and deteriorates output efficiency of the rotating electric machine.

An object of the present disclosure is to provide a magnetless rotating electric machine in which the coil does not break away from the rotor salient poles. Another object is to provide a magnetless rotating electric machine capable of improving an output further while preventing the coil from breaking away from the rotor.

SUMMARY

A magnetless rotating electric machine of the present disclosure includes: an annular outer stator having an outer exciting coil; an annular inner stator that is placed integrally inside the outer stator and has an inner exciting coil; an annular rotor that is interposed between an inner circumferential side of the outer stator and an outer circumferential side of the inner stator and has an annular rotor yoke and that includes an annular rotor yoke, a plurality of outer-inner salient pole pairs provided in pair along a circumferential direction on the outer circumferential side and the inner circumferential side of the rotor yoke, and a rotor yoke coil wound around the rotor yoke on one side and the rotor yoke on another side in the circumferential direction with each of the outer-inner salient pole pairs sandwiched therebetween; and rectifying elements that are connected to a point between the two ends of the rotor yoke coil to make a polarity of outer magnetic poles of the outer salient poles and a polarity of inner magnetic poles of the inner salient poles, which are magnetized by an induced current induced by magnetic excitation developing between the outer stator and the inner stator, identical with each other, wherein the rotor yoke coil is wound around the rotor yoke on the one side a predetermined number of turns in the circumferential direction and is wound around the rotor yoke on the other side a predetermined number of turns while a winding direction is changed to an opposite direction when the rotor yoke coil circumferentially crosses the outer-inner salient pole pair from the one side to the other side, and wherein, in connection with the circumferentially-adjacent outer-inner magnetic pole pairs, the rectifying elements make the polarity of the magnetic pole of the outer-inner salient pole pair on the one side opposite the polarity of the magnetic pole of the outer-inner salient pole pair on the other side.

In some embodiments the magnetless motor generator of the present disclosure, the rotor yoke coil is wound in a predetermined number of layers as a multilayer winding along a radial direction of the rotor yoke.

In some embodiments, the magnetless rotating electric machine of the present disclosure includes: an induction coil wound around the outer salient pole a predetermined number of turns from a leading-end side of the outer salient pole toward an outermost radial position of the multilayer winding of the rotor yoke coil and around the inner salient pole a predetermined number of turns from an outermost radial position of the multilayer winding of the rotor yoke coil toward a leading-end side of the inner salient pole while a winding direction of the induction coil is changed to an opposite direction when the induction coil crosses over the rotor yoke coil; and an induction-coil rectifying element that is connected to a point between an end of the induction coil on a part of the outer salient pole and an end of the induction coil on a part of the inner salient pole to make a polarity of an outer magnetic pole of the outer salient pole and a polarity of an inner magnetic pole of the inner salient pole, which are magnetized by the induced current induced by the induction coil, identical with the polarity of the magnetic pole magnetized by the rotor yoke coil.

In some embodiments of the magnetless rotating electric machine, a common rectifying element is used for the induction-coil rectifying element and the rectifying element used with the rotor yoke coil.

In the magnetless rotating electric machine, one common rectifying element is used for the outer-inner salient pole pairs having the same magnetic pole polarity among the plurality of outer-inner salient pole pairs.

Advantages of the Disclosure

A magnetless rotating electric machine of the present disclosure has outer-inner salient pole pairs on an outer circumference and an inner circumference of an annular rotor, and a rotor yoke coil is wound around a rotor yoke on one side and the rotor yoke on another side in a circumferential direction with the outer-inner salient pole pair sandwiched therebetween. An outer stator is placed on the outer circumference side of the annular rotor, and the inner stator is placed on an inner circumference side of the annular rotor. Interlinkage between excitation of the outer stator and excitation of the inner stator occurs on the rotor yoke coil, thereby inducing an induced current on the rotor yoke coil. The outer-inner salient pole pair thereby becomes magnetized, thus forming magnetic poles. Since torque develops between the outer stator and the annular rotor and between the inner stator and the annular rotor, an output of the magnetless rotating electric machine is improved. The rotor yoke coil is not wound around the outer salient pole and around the inner salient pole of the outer-inner salient pole pair. The rotor yoke coil is wound rather around the rotor yoke on the one side and the rotor yoke on the other side in the circumferential direction with the outer-inner salient pole pair sandwiched therebetween. Hence, the rotor can be prevented from breaking away from the rotor.

Moreover, in relation to the magnetless rotating electric machine of the present disclosure, when the rotor yoke coil is radially wound in layers, an output of the magnetless rotating electric machine is further improved.

Moreover, in the magnetless rotating electric machine of the present disclosure, the coil wound around the annular rotor is separately made up of the induction coil on a leading end side of the salient pole and the rotor yoke coil on a root side of the salient pole, an induced current caused by a field magnet originating from the stator becomes more intensive toward the leading end of the salient pole but less intensive toward the root of the salient pole. As a result of provision of the induction coil, the field magnet originating from the stator can efficiently cause an induced current, which improves the output of the magnetless rotating electric machine.

In the magnetless rotating electric machine of the present disclosure, the induction-coil rectifying element and the rectifying elements used with the rotor yoke coil can be grouped into one, so that cost can be curtailed. Moreover, when one common rectifying element is used for the outer-inner salient pole pairs having the same magnetic pole polarity among the plurality of outer-inner salient pole pairs, cost can be reduced. Even when the induction coil is provided, one common rectifying element is used for the outer-inner salient pole pairs having the same magnetic pole polarity, among the plurality of outer-inner salient pole pairs, whereby cost cutting can be achieved.

The ¥ present disclosure will be more clearly comprehended by reference to the embodiment provided below. However, the embodiments provided below are illustrative, and the scope of the present disclosure is not limited to the embodiment.

BRIEF DESCRIPTION OF THE DRAWINGS

A preferred embodiment of the present disclosure will be described in detail by reference to the following drawings, wherein.

DESCRIPTION OF EMBODIMENTS

An embodiment of the present disclosure will be described in detail hereunder by reference to the drawings. The number of poles, the number of salient poles, the number of outer and inner salient poles, the number of turns, and the number of layers in a multilayer coil are illustrative for explanation purpose, and can also be modified, as required, in conformity with specifications of the magnetless rotating electric machine. In the following, like reference numerals are assigned to like elements throughout the drawings, and their repeated explanations are omitted.

Figure 1:
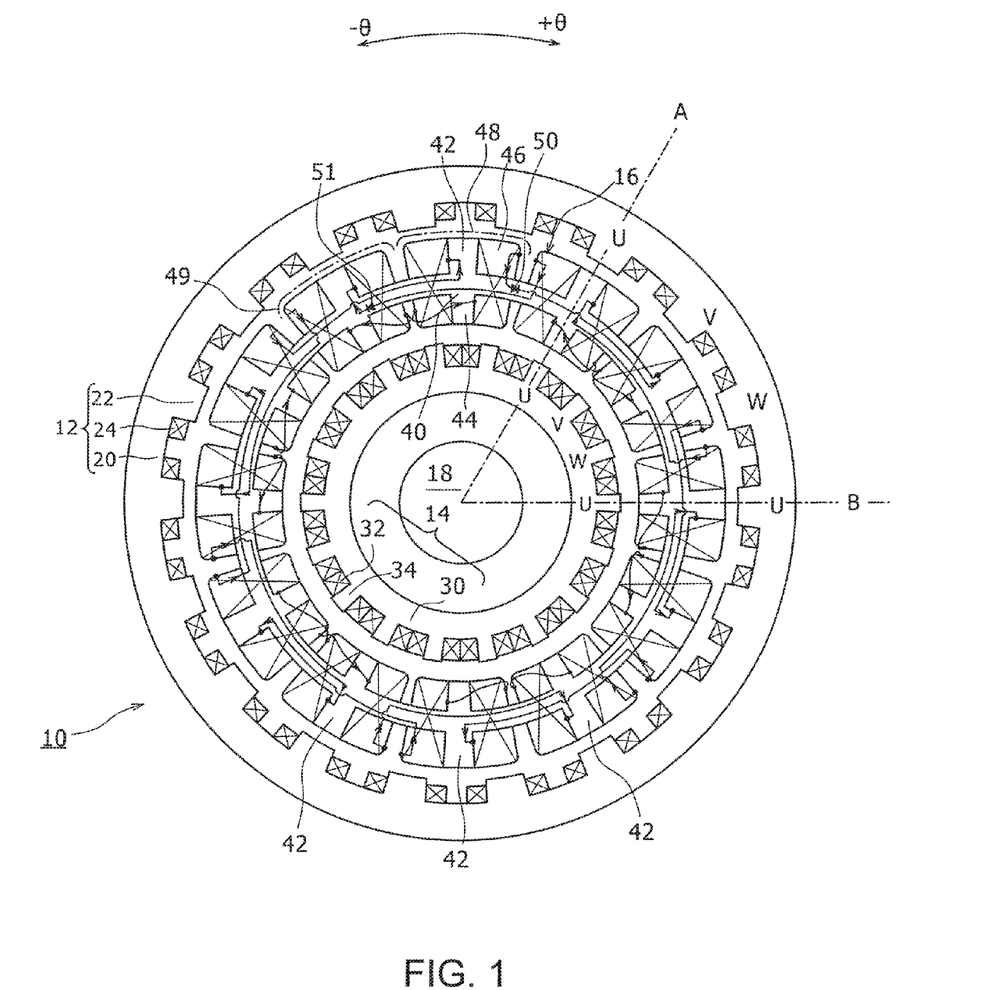
FIG. 1 is a schematic diagram of a magnetless rotating electric machine according to an embodiment of the present disclosure.

FIG. 1 is a schematic diagram that shows a configuration of a magnetless rotating electric machine 10 and is a cross sectional view perpendicular to an axial direction of the magnetless rotating electric machine 10. The magnetless rotating electric machine 10 is hereunder referred to as a "rotating electric machine 10" unless otherwise specified. Direction θ designates a circumferential direction in FIG. 1. With respect to the circumferential direction, a clockwise direction on a drawing sheet is direction +θ.

The rotating electric machine 10 is a three-phase synchronous motor generator and does not have permanent magnets as magnetic poles. The rotating electric machine 10 is a double-stator rotating electric machine including an annular rotor 16, an outer stator 12 placed opposite an outer circumference of the annular rotor 16; an inner stator 14 placed opposite an inner circumference of the annular rotor 16; and an output shaft 18. The outer stator 12 and the inner stator 14 are integrally fixed to an unillustrated motor case. The output shaft 18 is rotatably supported by the motor case. The annular rotor 16 and the output shaft 18 are integrated, and the annular rotor 16 rotates in space between the outer stator 12 and the inner stator 14, and a torque of the annular rotor 16 is output to the output shaft 18.

The annular rotor 16 includes a rotor yoke 40, outer-inner salient pole pairs 42 and 44, and a rotor yoke coil 46.

The rotor yoke 40 is an annular magnetic substance. The outer-inner salient pole pairs 42 and 44 are made up of outer salient poles 42 placed on an outer circumference side of the rotor yoke and inner salient poles 44 placed on an inner circumference side of the rotor yoke 40 along its circumferential direction. The outer salient poles 42 and the inner salient poles 44 radially protrude in pairs with the rotor yoke 40 sandwiched therebetween. As above, each of the outer-inner salient pole pairs 42 and 44 is a pair made up of the outer salient pole 42 and the inner salient pole 44. However, to distinguish the outer salient pole 42 and the inner salient pole 44 individually from each other, each is called the outer salient pole 42 or the inner salient pole 44 rather than a pair. In the embodiment shown in FIG. 1, twelve outer-inner salient pole pairs 42 and 44 are provided along a circumference of the rotor yoke 40. An angle between the circumferentially-adjacent outer-inner salient pole pairs 42 and 44 is 30 degrees.

The rotor yoke coil 46 is a coil wound around an outer circumferential surface of the rotor yoke 40 on one side and an outer circumferential surface of the rotor yoke 40 on the other side, in a circumferential direction, with the outer-inner salient pole pair 42 and 44 sandwiched therebetween. The rotor yoke coil 46 is not wound around outer circumferential surfaces of the outer-inner salient pole pair 42 and 44. The rotor yoke coil 46 is wound, a predetermined number of turns, around the rotor yoke 40 in its circumferential direction. The rotor yoke coil 46 is wound in layers in the radial direction of the rotor yoke 40. A way to wind the rotor yoke coil 46 will be described later by reference to FIG. 2.

The annular rotor 16 causes magnetic flux originating from an exciting coil of the outer stator 12 and magnetic flux originating from an exciting coil of the inner stator 14 to interlink across the rotor yoke coil 46, thereby magnetizing the outer-inner salient pole pairs 42 and 44 by an induced current developing in the rotor yoke coil 46. The magnetized outer-inner salient pole pair 42 and 44 serves as magnetless magnetic poles. Of the magnetized outer-inner salient pole pair 42 and 44, the magnetized outer salient pole 42 serves as an outer magnetic pole opposing the outer stator 12, and the magnetized inner salient pole 44 serves as an inner magnetic pole opposing the inner stator 14. The inner magnetic poles and the outer magnetic poles have the same polarity.

One outer-inner salient pole pair 42 and 44 is magnetized by the induced current flowing through the corresponding rotor yoke coil 46, thereby forming an outer magnetic pole and an inner magnetic pole. The pair is called a magnetic pole pair. FIG. 1 shows mutually-adjacent magnetic pole pairs 48 and 49 in the circumferential direction. The mutually-adjacent magnetic pole pairs 48 and 49 are opposite in polarity to each other. The annular rotor 16 has twelve magnetic pole pairs. The adjacent magnetic pole pairs 48 and 49 are opposite in polarity to each other. Twelve magnetic pole pairs are placed along a circumference of the annular rotor 16 in sequence of N, S, N, S, N, S, N, S, N, S, N, and S.

A rectifying element 50 is a diode for making the polarity of an inner magnetic pole identical with the polarity of an outer magnetic pole of the magnetic pole pair 48. A rectifying element 51 is a diode for making the polarity of an inner magnetic pole identical with the polarity of an outer magnetic pole of the magnetic pole pair 49. Further, in order to make the polarities of the mutually-adjacent magnetic pole pairs 48 and 49 opposite each other, the rectifying elements 50 and 51 are placed so as to make the direction of the induced current flowing through the rotor yoke coil 46 making up one magnetic pole pair 48 opposite the direction of the induced current flowing through the rotor yoke coil 46 making up the other magnetic pole pair 49.

The outer stator 12 has a plurality of outer stator salient poles 22 provided along an inner circumference of the annular outer stator yokes 20 and a plurality of outer exciting coils 24 wound respectively around the plurality of outer stator salient poles 22. The plurality of outer stator salient poles 22 are placed opposite the outer salient poles 42 of the annular rotor 16.

The plurality of outer exciting coils 24 are made up of a U-phase winding coil, a V-phase winding coil, and a W-phase winding coil. FIG. 1 shows A-B that is a range of one pole. An angle of the range of one pole (A-B) is 60 degrees. The three outer stator salient poles 22 are placed within the range (A-B). The three stator salient poles 22 placed in the range (A-B) of one pole include a U-phase salient pole wound with the U-phase winding coil; a V-phase salient pole wound with the V-phase winding coil; and a W-phase salient pole wound with the W-phase winding coil. U-phase, V-phase, and W-phase positions are allocated to the three outer stator salient poles 22 in the range (A-B) shown in FIG. 1. A total number of outer stator salient poles 22 is (3/2) times as many as a total number of outer salient poles 42 of the annular rotor 16; that is, 12×(3/2)=18. By means of concentrated winding, the U-phase winding coil is wound around the U-phase salient pole; the V-phase winding coil is wound around the V-phase salient pole; and the W-phase winding coil is wound around the W-phase salient pole.

The inner stator 14 has a plurality of inner stator salient poles 34 provided along an outer circumference of an annular inner stator yoke 30 and a plurality of inner exciting coils 32 wound respectively around the plurality of inner stator salient poles 34. The plurality of inner stator salient poles 34 are placed opposite the inner salient poles 44 of the annular rotor 16.

The plurality of inner exciting coils 32 are made up of the U-phase winding coil, the V-phase winding coil, and the W-phase winding coil. A range of one pole of the inner stator 14 is the same as the range (A-B) of one pole of the outer stator 12. Three inner stator salient poles 34 are placed within the range (A-B). The three inner stator salient poles 34 in the range (A-B) include the U-phase salient pole wound with the U-phase winding coil, the V-phase salient pole wound with the V-phase winding coil, and the W-phase salient pole wound with the W-phase winding coil. The position of a U-phase, the position of a V-phase, and the position of a W-phase are allocated to the three inner stator salient poles 34 within the range (A-B) shown in FIG. 1. The total number of inner stator salient poles 34 is 18 as in the case of the total number of the outer stators 12. By means of concentrated winding, the U-phase winding coil is wound around the U-phase salient pole; the V-phase winding coil is wound around the V-phase salient pole; and the W-phase winding coil is wound around the W-phase salient pole.

In the above configuration, experiencing a field magnet generated by the outer exciting coils 24 of the outer stator 12 and a field magnet generated by the inner exciting coils 32 of the inner stator 14, the rotor yoke coil 46 of the annular rotor 16 generates an induced current. Being magnetized by the induced current, the outer salient poles 42 generate outer magnetic poles, and the inner salient poles 44 generate inner magnetic poles. By means of cooperation between the thus-generated outer magnetic poles and the field magnet originating from the outer stator 12 and cooperation between the thus-generated magnetic poles and the magnetic field originating from the inner stator 14, the annular rotor 16 rotates, thereby generating torque. As above, although permanent magnets are not placed in the annular rotor 16, torque develops. This is the principle of torque generation of the magnetless rotating electric machine 10.

One rotating electric machine section can be made up of the annular rotor 16 and the outer stator 12, and another rotating electric machine section can be made up of the annular rotor 16 and the inner stator 14. Thus, one rotating electric machine 10 has two rotating electric machine sections.

Figure 2:
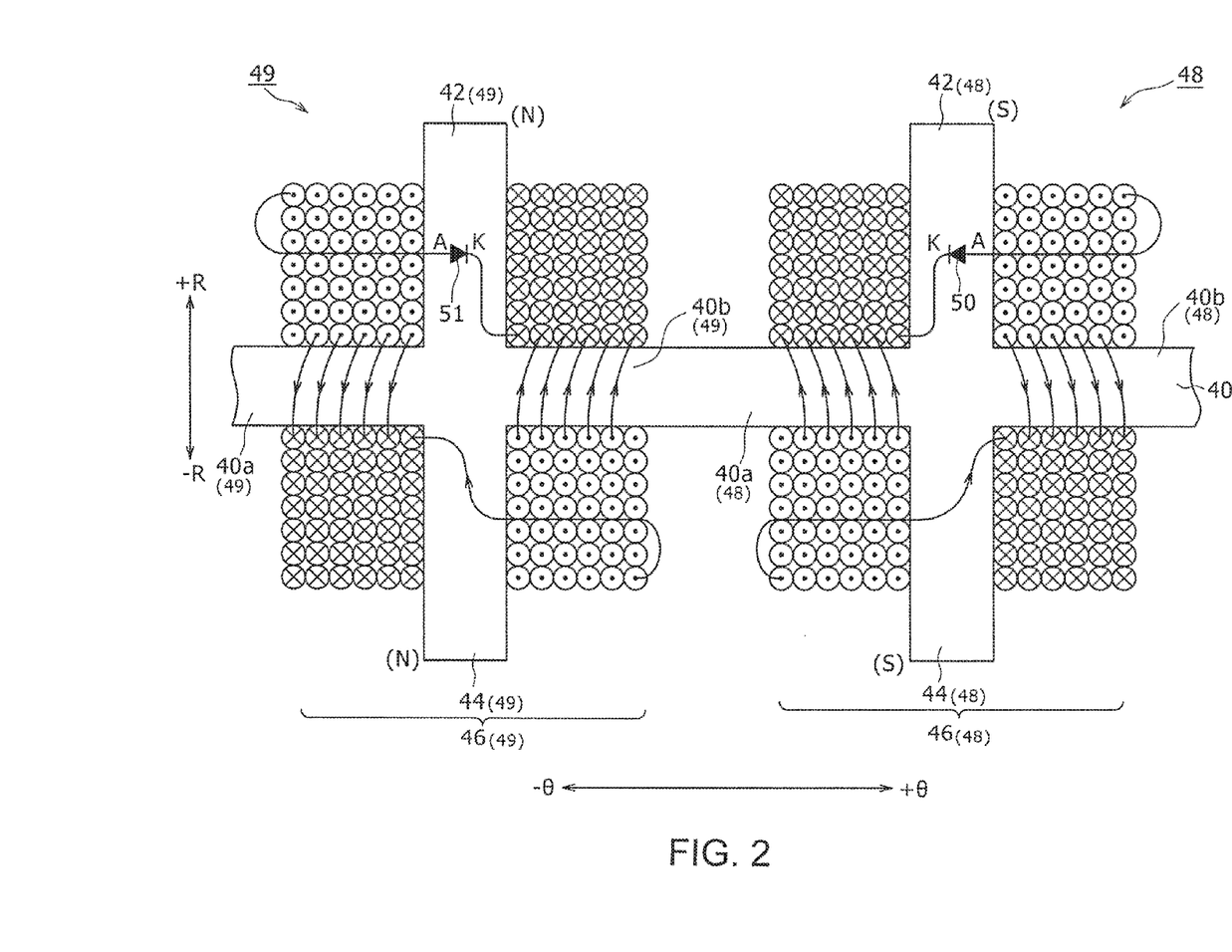
FIG. 2 is a view showing a way to wind a rotor yoke coil in connection with FIG. 1.

A way to wind the rotor coil 46 is now described. FIG. 2 is a view that magnifies the rotor yoke coil 46 in both the direction θ which is a circumferential direction and the direction R which is the radial direction, showing the way to wind the rotor coil 46 around the magnetic pole pairs 48 and 49. When viewed in the direction θ that is the circumferential direction, the way to wind the rotor coil 46 around the magnetic pole pair 49 is laterally symmetric with the way to wind the rotor coil 46 around the magnetic pole pair 48. Accordingly, the way to wind the magnetic pole pair 48 is first described, and a difference is described in connection with the magnetic pole pair 49.

A right side of a drawing sheet of FIG. 2 shows, in connection with the magnetic pole pair 48 the rotor yoke 40, the outer salient pole 42, the inner salient pole 44, and the rotor yoke coil 46. Further, in relation to the magnetic pole pair 48, there is also illustrated the rectifying element 50 that takes a direction of the induced current flowing through the rotor yoke coil 46 as one direction. The rectifying element 50 is connected to a point between a winding start terminal and a winding end terminal of the rotor yoke coil 46.

The rotor yoke coil 46 is wound around the rotor yokes 40 on both sides with the outer-inner salient pole pair 42 and 44 sandwiched therebetween. The coil is wound around the annular rotor yokes 40 rather than around the outer-inner salient pole pair 42 and 44, whereby a magnetless motor in which the coil does not break away from the outer salient pole 42 and the inner salient pole 44 can be realized.

In the following, the rotor yokes 40 on both sides of the outer-inner salient pole pair 42 and 44 are distinguished from each other. A rotor yoke portion located in a direction –θ is referred to as a rotor yoke 40*a* on one side of the outer-inner salient pole pair 42 and 44. A rotor yoke portion located in a direction +θ is referred to as a rotor yoke 40*b* on the other side of the outer-inner salient pole pair 42 and 44.

The rotor yoke coil 46 is wound a predetermined number of turns around the rotor yoke 40*a* on one side along its circumferential direction, thereby forming a layer of a winding wire. The windings are superimposed into a predetermined number of layers along a radial direction, thereby forming a multilayer winding wire. Next, the rotor yoke coil crosses the outer-inner salient pole pair 42 and 44 to the rotor yoke 40*b* on the other side, and the direction of winding is switched to an opposite direction. The winding wire is wound a predetermined number of turns around the rotor yoke 40*b* on the other side along its circumferential direction, thereby forming a layer of winding. The windings are superimposed into a predetermined number of layers along the radial direction, thereby forming a multilayer winding wire. The radial direction is a direction in which the outer-inner salient pole pair 42 and 44 protrudes.

The winding start position of the rotor yoke coil 46 of multilayer winding in FIG. 2 lies in a corner where a cross exists between the rotor yoke 40*a* on one side and the outer salient pole 42. In FIG. 2, the corner corresponds to a position where a cathode K of the diode that is the rectifying element 50 is to be connected. Winding of a first layer on the rotor yoke 40*a* on one side is performed from the winding start position along the circumferential direction of the rotor yoke 40*a* on one side in the direction –θ. In FIG. 2, a circled solid dot denotes that a winding wire is turned from a deep interior position in the drawing sheet toward a position proximal to the viewer. A circled X denotes a winding wire turned from the proximal position to the deep interior position of the drawing sheet. In relation to winding of the rotor yoke 40*a* on one side, the circled solid dot is on a part of the interior salient pole 44, and the circled X is on a part of the outer salient pole 42. The rotor yoke coil 46 is thereby wound six turns around the rotor yoke 40*a* on one side from the winding start position along the direction –θ in a direction of advancement of a right-hand screw, thus performing winding of a first layer.

A second layer is superposed on the first layer to the outside in the radial direction. A winding start position of the second layer is displaced by one turn from the winding start position of the first layer in a direction of extension of the outer salient pole 42. Like the first layer, winding the second layer starts from the winding start position in the direction –θ along the circumferential direction of the rotor yoke 40*a* on one side. In the embodiment shown in FIG. 2, the rotor yoke coil is wound six turns from the winding start position of the second layer in the direction of advancement of the right-hand screw along the direction –θ, thus winding the second layer. When winding a seventh layer finishes through repetition of winding operation in the embodiment shown in FIG. 2, winding six turns around the rotor yoke 40*a* on one side in the circumferential direction and seven layers in the radial direction finishes as a multilayer winding around the rotor yoke 40*a* on one side. The number of layers achieved in the radial direction can be appropriately set within a range from the circumferential surface of the rotor yoke 40 to a leading end of the outer salient pole 42 and a leading-end of the inner salient pole 44 where the rotor yoke coil can be layered. The number of turns achieved in the circumferential direction can be appropriately set within a range of turns where an interference does not occur in an interval, in the direction θ, between the adjacent outer-inner salient pole pairs 42 and 44. The number of layers and the number of turns are illustrative for explanation, and another number of layers and another number of turns can also be adopted.

When multilayer winding around the rotor yoke 40*a* on one side finishes, the winding wire crosses over the outer-inner salient pole pair 42 and 44. A winding start of the rotor yoke 40*b* on the other side lies in a corner where a cross exists between the rotor yoke 40*b* on the other side and the inner salient pole 44 cross each other. Winding a first layer around the rotor yoke 40*b* on the other side starts from the winding start position in the direction +θ along the circumferential direction of the rotor yoke 40*b* on the other side. In relation to the winding around the rotor yoke 40*b* on the other side, the circled dot is on the part of the outer salient pole 42, and the circled X is on the part of the inner salient pole 44. The rotor yoke coil 46 is wound six turns around the rotor yoke 40*b* on the other side from the winding start position in the direction of advancement of the right-hand screw along the direction +θ, thus performing winding of the first layer.

Procedures that are the same as those described in connection with the rotor yoke 40*a* on one side are repeated hereunder. After winding the seventh layer finishes, winding the six turns in the circumferential direction and winding the seven layers in the radial direction are completed as multilayer winding around the rotor yoke 40*b* on the other side. A position on the rotor yoke 40*b* on the other side where multilayer winding finishes lies in a position where an anode A of the diode serving as the rectifying element 50 is to be connected. Any winding method other than that mentioned above can also be adopted, so long as the method makes it possible to form a plurality of windings in the radial direction and a plurality of windings in the circumferential direction.

After multilayer winding around the rotor coil 40*a* on one side is completed, the winding wire crosses over the outer-inner salient pole pair 42 and 44 to the rotor yoke 40*b* on the other side, where the direction of winding is changed to an opposite direction. In the embodiment shown in FIG. 2, this means that right-hand winding from the direction +θ direction to the −θ direction on the rotor yoke 40a on one side is changed to right-hand winding from the direction −θ direction to the +θ direction on the rotor yoke 40b on the other side. In FIG. 2 a direction in which the electric current rectified by the rectifying element 50 flows to the rotor yoke coil 46 is designated by an arrow. In FIG. 2, the direction of flow of electric current is identical with the direction of winding of the winding wire. The cathode K of the rectifying element 50 is connected to the winding start of the rotor yoke coil 46, and the anode A of the rectifying element 50 is connected to the winding end of the rotor yoke coil 46.

As shown in FIG. 2, the direction in which the electric current rectified by the rectifying element 50 flows to the rotor yoke coil 46 is changed to the opposite direction across the outer-inner salient pole pair 42 and 44. As to a direction of magnetic flux induced by the electric current rectified by the rectifying element 50, the outer-inner salient pole pair 42 and 44 has the S pole at the rotor yoke 40a on one side. The outer-inner salient pole pair 42 and 44 has the S pole even on the rotor yoke 40b on the other side. Both the outer salient pole 42 and the inner salient pole 44 are polarized to the S pole.

As above, the rectifying element 50 is connected to a point between the two ends of the rotor yoke coil 46 and makes the polarity of the outer magnetic pole of the outer salient pole 42 identical with the polarity of the inner magnetic pole of the inner salient pole 44 that are magnetized by an induced current induced by the rotor yoke coil 46 by means of excitation of the outer stator 12 and the inner stator 14.

The magnetic pole pair 48 is illustrated on the right-side part of the drawing sheet of FIG. 2, and the magnetic pole pair 49 immediately adjacent to the magnetic pole pair 48 in the circumferential direction of the rotor yoke 40 is illustrated on the left-side part of the drawing sheet of FIG. 2. Exclusive of being laterally symmetric with the magnetic pole pair 48 in the direction θ, the magnetic pole pair 49 is totally identical with the magnetic pole pair 48 in terms of the way of winding of the rotor yoke coil 46 and the direction of connection of the diode that is the rectifying element 51. As to the direction of the magnetic flux induced by the electric current rectified by the rectifying element 51 in the magnetic pole pair 49, the rotor yoke 40a on one side close to the outer-inner salient pole pair 42 and 44 has the N pole, and the rotor yoke 40b on the other side close to the outer-inner salient pole pair 42 and 44 has the N pole. As above, in the magnetic pole pair 49, both the outer salient pole 42 and the inner salient pole 44 are magnetized to the N pole.

As above, in relation to the adjacent magnetic pole pairs 48 and 49, the rectifying elements 50 and 51 make the magnetic pole polarity of the outer-inner salient pole pair 42 and 44 of the magnetic pole pair 48 on one side opposite the magnetic pole polarity of the outer-inner salient pole pair 42 and 44 of the magnetic pole pair 49 on the other side.

Turning back to FIG. 1, the annular rotor 16 has the twelve magnetic pole pairs. However, the circumferentially-adjacent magnetic pole pairs 48 and 49 are opposite in polarity to each other. The twelve magnetic pole pairs are placed around the annular rotor 16 in sequence of polarities N, S, N, S, N, S, N, S, N, S, N, and S. When one rectifying element 50 is provided for one outer-inner salient pole pair 42 and 44 as shown in FIG. 2, the twelve rectifying elements 50 and 51 are placed around the annular rotor 16. The magnetic pole pairs disposed one after another on the annular rotor 16 along its circumferential direction have the same polarity, and the polarities are only two; that is, N and S. Accordingly, the rotor yoke coils 46 of the outer-inner salient pole pair 42 and 44 having the same magnetic pole polarity, among the plurality of outer-inner salient pole pairs 42 and 44, are connected in series, and one common rectifying element is provided. In FIG. 1, one rectifying element 50 is used for six outer-inner salient pole pairs 42 and 44 having the S pole, and one rectifying element 51 is used for the six outer-inner salient pole pairs 42 and 44 having the N pole.

Figure 3:
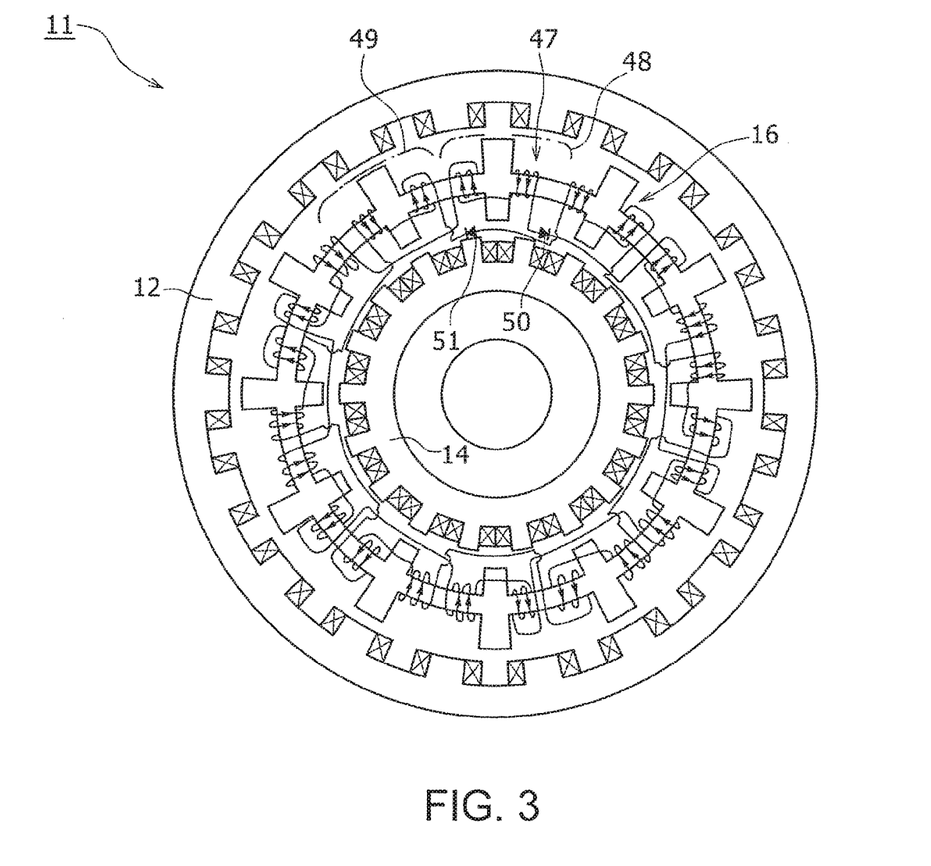
FIG. 3 is a view in which the rotor yoke coil shown in FIG. 1 is wound in one layer.

In the above, the rotor yoke coil 46 is radially wound in layers. Even when the rotor yoke coil 46 is radially wound in one layer, the coil will not break away from the outer salient pole 42 and the inner salient pole 44, because the coil is wound around the annular rotor yoke 40. FIG. 3 is a view showing a rotating electric machine 11 using a rotor yoke coil 47, which is radially wound in one layer, for each of the magnetic pole pairs 48 and 49 shown in FIG. 1. By using the rotor yoke coil 46 radially wound in a plurality of layers as shown in FIG. 1, the rotating electric machine 10 is improved as compared with the rotating electric machine 11 having one layer of winding in terms of an output.

Figure 4:
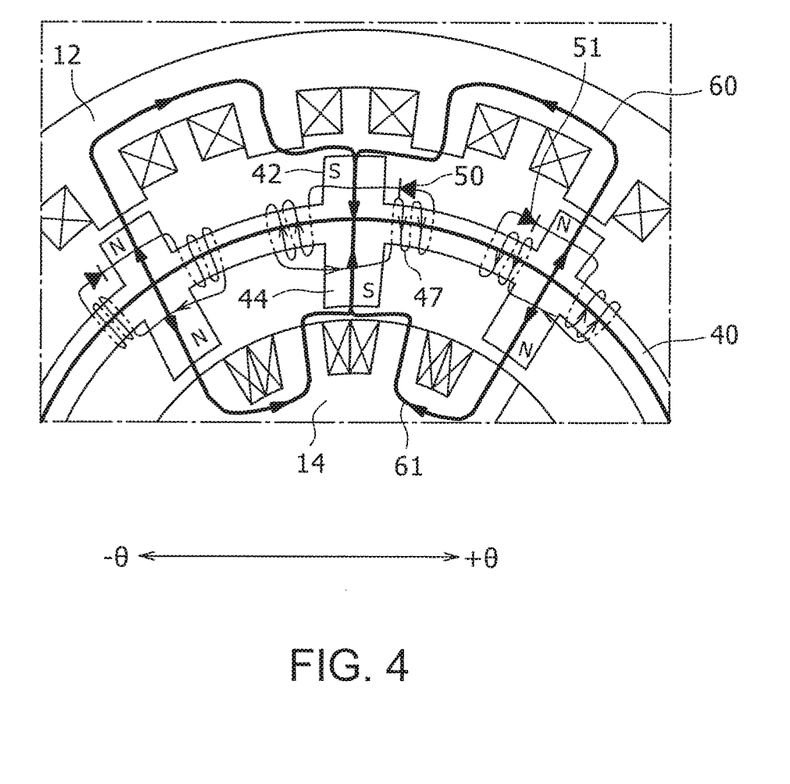
FIG. 4 is a view showing a way of flow of magnetic flux by reference to FIG. 3.

FIG. 4 is an enlarged view of a portion of three adjacent magnetic pole pairs shown in FIG. 3. The flow of magnetic flux achieved at the time of operation of the rotating electric machine 10 is now described by reference to FIG. 4. FIG. 4 relates to the rotor yoke coil 47 of single-layer winding. The flow of magnetic flux of the rotor yoke coil 47 also applies to the rotor yoke coil 46 having a multilayer winding. In FIG. 4, one rectifying element is provided for one magnetic pole pair for the sake of convenience of explanation.

The magnetic pole pair provided at the center of FIG. 4 is the same as the magnetic pole pair 48 described by reference to FIG. 2. By operation of the rectifying element 50, the outer-inner salient pole pair 42 and 44 are both polarized to the S pole. The adjacent magnetic pole pair 49 is magnetized to the N pole by operation of the rectifying element 51. In conformity with the magnetic pole polarity of the magnetic pole pair generated on the annular rotor 16, a field magnet of the outer stator 12 and a field magnet of the inner stator 14 are controlled.

A flow 60 of magnetic flux originating from the outer stator 12 enters the rotor yoke 40 by way of the outer salient pole 42 of the S-polarized outer-inner salient pole pair 42 and 44. The magnetic flux returns to the outer stator 12 through the N-polarized outer salient pole 42 of the adjacent outer-inner salient pole pair 42 and 44. By means of the flow of magnetic flux, rotating torque develops between the annular rotor 16 and the outer stator 12.

Likewise, a flow 61 of magnetic flux originating from the inner stator 14 enters the rotor yoke 40 by way of the inner salient pole 44 of the S-polarized outer-inner salient pole pair 42 and 44. The magnetic flux returns to the inner stator 14 through the N-polarized inner salient pole 44 of the adjacent outer-inner salient pole pair 42 and 44. By means of the flow of magnetic flux, rotating torque develops between the annular rotor 16 and the outer stator 12.

Figure 5:
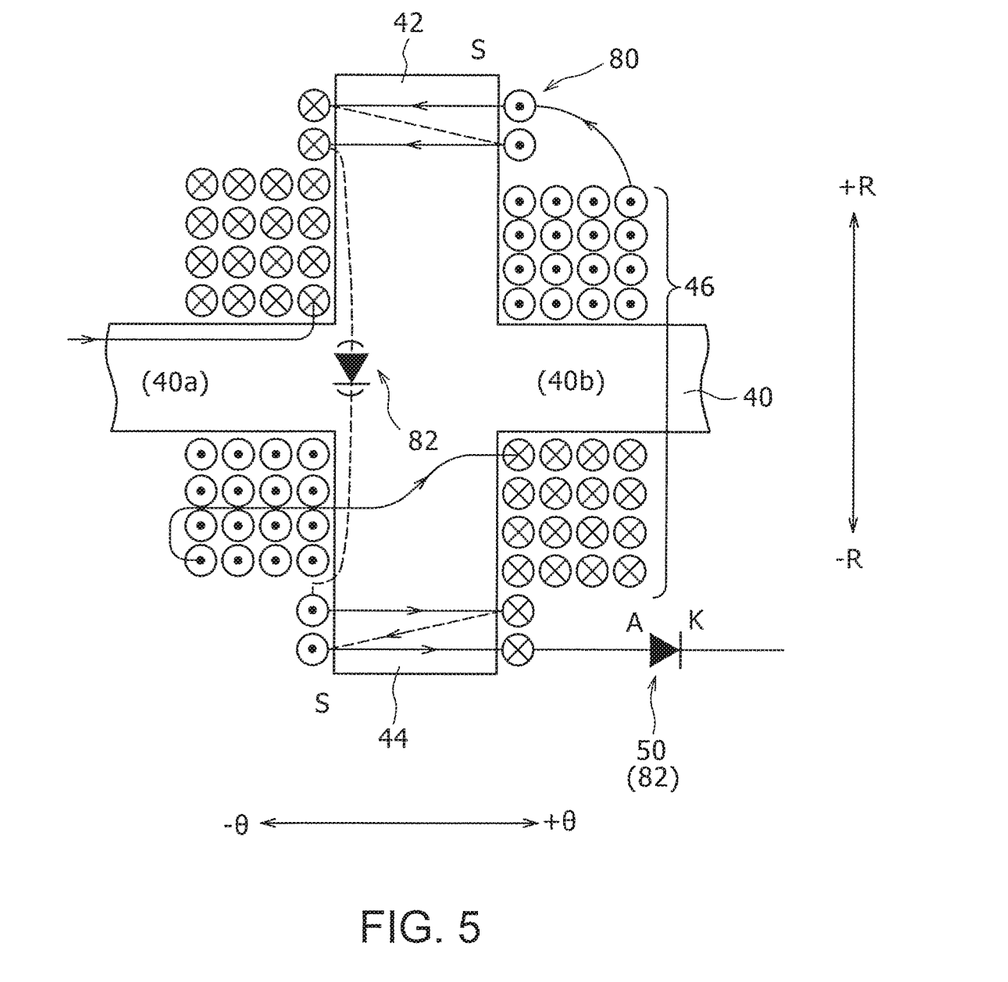
FIG. 5 is a view showing an induction coil added to the configuration shown in FIG. 2.

In the above, the outer salient pole 42 and the inner salient pole 44 are described as not being wound with the coil. However, the induced current developing in the coil wound around the annular rotor 16 from field magnetization caused by the outer stator 12 becomes more intensive toward the top end of the salient pole but less intensive toward the root of the salient pole. The same also applies to the induced current caused by field magnetization originating from the inner stator 14. FIG. 5 is a view showing a way to wind an induction coil 80 around an exposed portion of a leading end of each of the outer salient pole 42 and the inner salient pole 44 by covering the outer-inner salient pole pair 42 and 44 with multilayer winding in such a way that the portion of the leading end is left uncovered. The field magnetization of the outer stator 12 and the inner stator 14 is effectively converted into an induced current, so that an output of the rotating electric machine 10 can be improved.

The induction coil 80 is wound a predetermined number of turns around the outer circumferential surface of the outer salient pole pair 42 and 44 from the leading-end of the outer salient pole 42 to the radially-outermost position of a multilayer coil of the rotor yoke coil 46. The induction coil 80 is wound a predetermined number of turns from the radially-outermost position of the multilayer rotor yoke coil 46 on the inner salient pole 44 to the leading end of the inner salient pole 44 after crossing over the rotor yoke coil 46. When entering the inner salient pole 44 in excess of the rotor yoke coil 46, the direction of winding is switched to an opposite direction.

In FIG. 5, a predetermined number of turns=2 is achieved on the outer salient pole 42, and the winding direction is the direction of the right-hand screw from the direction +R to the direction −R along the radial direction of the annular rotor 16. A predetermined number of turns=2 is achieved on the inner salient pole 44, and the winding direction is the direction of a left-hand screw from the direction +R to the direction −R along the radial direction of the annular rotor 16.

An induction-coil rectifying element 82 is connected to a point between the two ends on the outer salient pole 42 side and the inner salient pole 44 side of the induction coil 80. The polarity of the outer magnetic pole of the outer salient pole 42 and the polarity of the inner magnetic pole of the inner salient pole 44, which are magnetized by the induced current induced by the induction coil 80, are made identical with the polarity of the magnetic pole magnetized by the rotor yoke coil 46. As described by reference to FIG. 2, the polarity of the magnetic pole magnetized by the rotor yoke coil 46 is the S pole on both the outer salient pole 42 and the inner salient pole 44. The induction coil rectifying element 82 is connected with a placement given a parenthesized diode symbol in FIG. 5.

The rotor yoke coil 46 and the induction coil 80 are connected in series, whereby the rectifying element 50 used in the rotor yoke coil 46 and the induction-coil rectifying element 82 can be made common. In the embodiment shown in FIG. 5, an end of winding of the rotor yoke coil 46 on the rotor yoke 40b on the other side and an end of the winding of the induction coil 80 in the direction +R of the outer salient pole 42 are connected. After the induction-coil rectifying element 82 arranged with the placement given the parenthesized diode symbol in FIG. 5 is omitted, an end of the induction coil 80 in the direction −R of the inner salient pole 44 is connected to the anode A of the rectifying element 50. The rectifying element 50, or a rotor-yoke rectifying element, can thereby be caused to double as the induction-coil rectifying element 82. The polarity of the magnetic pole generated by the induction coil 80 and the polarity of the magnetic pole generated by the rotor yoke coil 46 can be made identical with each other by using only one rectifying element 50 as a whole.

Figure 6:
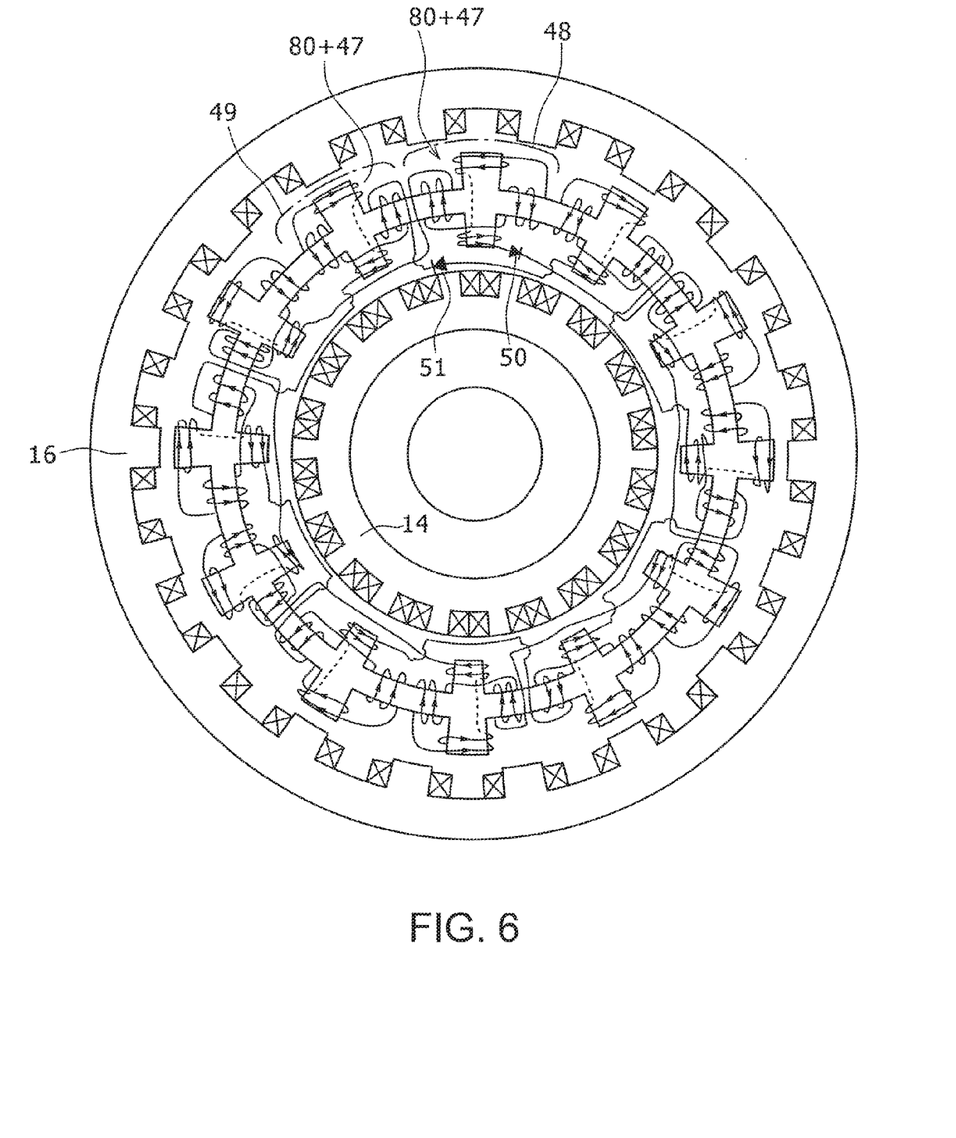
FIG. 6 is a schematic diagram of a magnetless rotating electric machine achieved at the time of addition of the induction coil.

FIG. 6 is a schematic diagram corresponding to FIG. 3, wherein coils to be wound around the magnetic pole pairs 48 and 49 are made up of a combination (the induction coil 80+ the rotor yoke coil 47). The respective induction-coil rectifying elements for the magnetic pole 48 and the magnetic pole 49 are made common to the rectifying elements 50 and 51 for the rotor yoke coil 47. Moreover, as mentioned in connection with FIG. 3, the rotor yoke coils 47 of the inner-outer salient pole pairs 42 and 44 having the same magnetic pole polarity, among the plurality of outer-inner salient pole pairs 42 and 44, are connected in series. As a result, the annular rotor 16, in its entirety, requires only two rectifying elements 50 and 51.

Figure 7:
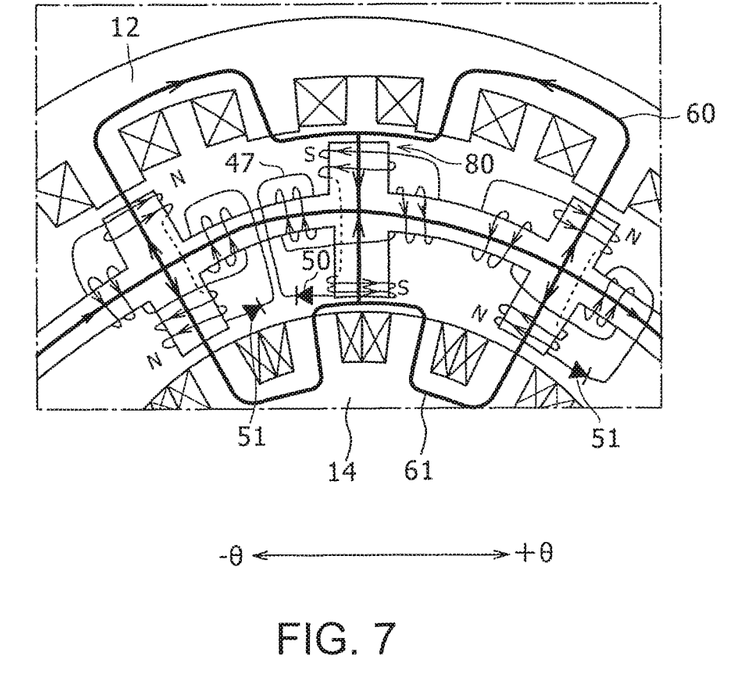
FIG. 7 is a view showing the way of flow of magnetic flux achieved when the induction coil is added, by reference to FIG. 6.

FIG. 7 is a view corresponding to FIG. 4, showing the flows of magnetic flux 60 and 61. A direction of the magnetic pole magnetized by the induction coil 80 is the same as a direction of the magnetic pole magnetized by the rotor yoke coil 47. The flows of magnetic flux 60 and 61 are the same as those described by reference to FIG. 4. The flows of magnetic flux 60 and 61 magnetize the outer salient poles 42 and the inner salient poles 44 more efficiently by use of the induction coil 80, whereby the output of the rotating electric machine 10 can be improved.

DESCRIPTIONS OF REFERENCE SYMBOLS 10, 11 (MAGNETLESS) ROTATING ELECTRIC MACHINE, 12 OUTER STATOR, 14 INNER STATOR, 16 ANNULAR ROTOR, 18 OUTPUT SHAFT, 20 OUTER STATOR YOKE, 22 OUTER STATOR SALIENT POLE, 24 OUTER EXCITING COIL, INNER STATOR YOKE, 32 INNER EXCITING COIL, 34 INNER STATOR SALIENT POLE, 40 ROTOR YOKE, 40a ROTOR YOKE (ON ONE SIDE), 40b ROTOR YOKE (ON THE OTHER SIDE), 42 OUTER SALIENT POLE, 42,44 OUTER-INNER SALIENT POLE PAIR, 44 INNER SALIENT POLE, 46, 47 ROTOR YOKE COIL, 48, 49 MAGNETIC POLE PAIR, 51, 51 RECTIFYING ELEMENT, 60, 61 FLOW OF MAGNETIC FLUX, 80 INDUCTION COIL, 82 INDUCTION-COIL RECTIFYING ELEMENT

The invention claimed is:
1. A magnetless rotating electric machine comprising:
an annular outer stator having an outer exciting coil;
an annular inner stator that is placed integrally inside the outer stator and has an inner exciting coil;
an annular rotor that is interposed between an inner circumferential side of the outer stator and an outer circumferential side of the inner stator and that includes an annular rotor yoke,
a plurality of outer-inner salient pole pairs provided in pairs along a circumferential direction on the outer circumferential side and the inner circumferential side of the rotor yoke, and
a rotor yoke coil wound around the rotor yoke on one side and the rotor yoke on another side in the circumferential direction with each of the outer-inner salient pole pairs sandwiched therebetween; and
rectifying elements that are connected between the two ends of the rotor yoke coil to make a polarity of outer magnetic poles of the outer salient poles and a polarity of inner magnetic poles of the inner salient poles, which are magnetized by an induced current induced by magnetic excitation of the outer stator and the inner stator, identical with each other;
wherein the rotor yoke coil is wound around the rotor yoke on the one side a predetermined number of turns in the circumferential direction and is wound around the rotor yoke on the other side a predetermined number of turns while a winding direction is changed to an opposite direction when the rotor yoke coil circumferentially crosses the outer-inner salient pole pair from the one side to the other side, and wherein, in connection with the circumferentially-adjacent outer-inner magnetic pole pairs, the rectifying elements make the polarity of the magnetic pole of the outer-inner salient pole pair on the one side opposite the polarity of the magnetic pole of the outer-inner salient pole pair on the other side.

2. The magnetless rotating electric machine according to claim 1, wherein the rotor yoke coil is wound in a predetermined number of layers as a multilayer winding along a radial direction of the rotor yoke.

3. The magnetless rotating electric machine according to claim 2, wherein an induction coil comprising:

an induction coil wound around the outer salient pole a predetermined number of turns from a leading-end side of the outer salient pole toward an outermost radial position of the multilayer winding of the rotor yoke coil and around the inner salient pole a predetermined number of turns from an outermost radial position of the multilayer winding of the rotor yoke coil toward a leading-end side of the inner salient pole while a winding direction of the induction coil is changed to an opposite direction when the induction coil circumferentially crosses over the outer-inner salient pole pair; and an induction-coil rectifying element that is connected between an end of the induction coil on a part of the outer salient pole and an end of the induction coil on a part of the inner salient pole to make a polarity of an outer magnetic pole of the outer salient pole and a polarity of an inner magnetic pole of the inner salient pole, which are magnetized by the induced current induced by the induction coil, identical with the polarity of the magnetic pole magnetized by the rotor yoke coil.

4. The magnetless rotating electric machine according to claim 3, wherein a common rectifying element is used for the induction-coil rectifying element and the rectifying element used with the rotor yoke coil.

5. The magnetless rotating electric machine according to claim 1, wherein one common rectifying element is used for the outer-inner salient pole pairs having the same magnetic pole polarity among the plurality of outer-inner salient pole pairs.

6. The magnetless rotating electric machine according to claim 2, wherein one common rectifying element is used for the outer-inner salient pole pairs having the same magnetic pole polarity among the plurality of outer-inner salient pole pairs.

7. The magnetless rotating electric machine according to claim 4, wherein one common rectifying element is used for the outer-inner salient pole pairs having the same magnetic pole polarity among the plurality of outer-inner salient pole pairs.

* * * * *